US007010214B2

(12) United States Patent  (10) Patent No.: US 7,010,214 B2
Suh  (45) Date of Patent: Mar. 7, 2006

(54) APPARATUS AND METHOD FOR DETECTING VIDEO CASSETTE RECORDER SIGNALS

(75) Inventor: Young-chul Suh, Seoul (KR)

(73) Assignee: Samsung Electronics, Co., Ltd., (KR)

( * ) Notice: Subject to any disclaimer, the term of this patent is extended or adjusted under 35 U.S.C. 154(b) by 1131 days.

(21) Appl. No.: 09/918,927

(22) Filed: Jul. 30, 2001

(65) Prior Publication Data

US 2002/0090205 A1    Jul. 11, 2002

(30) Foreign Application Priority Data

Jan. 11, 2001    (KR)    ................................. 2001-1552

(51) Int. Cl.
  *H04N 5/91*    (2006.01)
(52) U.S. Cl. .................................. 386/46; 58/59; 58/72
(58) Field of Classification Search ................. 386/46, 386/58, 59, 71, 72, 84, 85
  See application file for complete search history.

(56) References Cited

U.S. PATENT DOCUMENTS 5,282,098 A *    1/1994    Ohta et al. ................ 360/73.04
6,504,991 B1 *    1/2003    Higurashi et al. ............ 386/67

* cited by examiner

Primary Examiner—Huy Nguyen

(74) *Attorney, Agent, or Firm*—Mills & Onello LLP

(57) ABSTRACT

An apparatus and a method for detecting a VCR signal includes a horizontal tracking portion for receiving a synchronous signal of an image signal and a system clock signal, for determining and outputting a phase error between the synchronous signal and a standard horizontal synchronous signal generated by the system clock signal, and generating a horizontal synchronous signal and a vertical synchronous signal in response to the system clock signal, and a VCR signal detecting portion for receiving the vertical synchronous signal, the horizontal synchronous signal, and the phase error. The horizontal tracking portion includes a phase comparator for receiving the synchronous signal and the system clock signal, and generating the phase error, phase difference between the synchronous signal and a standard horizontal synchronous signal generated by the system clock signal, a pixel counter for receiving and counting the system clock signal, and a timing generator for receiving a pixel counter value, an output of the pixel counter, and generating a horizontal synchronous signal and a vertical synchronous signal. The VCR signal detecting portion includes a head switch pulse period generator which is reset by the vertical synchronous signal, receives the horizontal synchronous signal, and determines a specific pulse period as a head switch pulse period, and a VCR signal detector for receiving the phase error during a specific head switch pulse period, and detecting the synchronous signal as the VCR signal if the phase error exceeds a specific standard phase error value. According to the apparatus and the method for detecting a VCR signal, it is possible to more precisely detect a VCR signal.

7 Claims, 3 Drawing Sheets

APPARATUS AND METHOD FOR DETECTING VIDEO CASSETTE RECORDER SIGNALS

BACKGROUND OF THE INVENTION

1. Field of the Invention

The present invention relates to an apparatus and a method for detecting video cassette recorder (VCR) signals, and more particularly, to an apparatus and a method for detecting video cassette recorder signals with respect to phase errors related to head switch pulse generation.

2. Description of the Related Art

Generally, in an image display device such as a television, a phase locked loop is used to remove jitter from a horizontal synchronous signal so that the starting point of a field for displaying image information does not appear to "shake".

FIG. 1 is a general block diagram illustrating a phase locked loop 100 for horizontal synchronization. The phase locked loop 100 of FIG. 1 includes a tracking portion 110, a discrete time oscillating portion 120, an analog phase locked loop 130, and first and second multipliers 140 and 150. In FIG. 1, signals input into the phase locked loop 100 for horizontal synchronization are synchronous signals of image signals introduced through a television antenna or reproduced by a video cassette recorder (VCR). Television signals include horizontal synchronous signals of one horizontal (H) period at every horizontal line, an equalizing pulse of 0.5 horizontal (H) period during each blanking pulse period at every field, and a vertical serrated pulse. However, image signals reproduced in a VCR further include a head switch pulse in addition to the horizontal synchronous signal, equalizing pulse, and vertical serrated pulse.

The tracking portion 110 receives synchronous signals (SYNC_S) of image signals, and detects a phase error, the phase error representing the phase difference between a standard horizontal synchronous signal produced by a system clock signal (SYSCLK) at every horizontal line and the synchronous signal (SYNC_S). A specific operation is performed on the phase error, and a frequency value (FREQ) is produced. The discrete time oscillating portion 120 receives a frequency value (FREQ) output from the tracking portion 110, and generates a specific frequency signal (FREQS). A clock signal (XTAL_CK) applied to the discrete time oscillating portion 120 is an external clock signal, and becomes a standard clock signal for the discrete time oscillating portion 120. The analog phase locked loop 130 is used for reducing jitter from the frequency signal (FREQS) produced by the discrete time oscillating portion 120. The first multiplier 140 multiplies an output signal of the analog phase locked loop 130, and applies it to the tracking portion 110 as a system clock signal (SYSCLK). The second multiplier 150 multiplies the system clock signal (SYSCLK) output from the first multiplier 150 again, and applies it as a standard clock signal for the analog phase locked loop 130.

FIG. 2 is a block diagram illustrating an apparatus for detecting a VCR signal. The conventional apparatus for detecting a VCR signal illustrated in FIG. 2 includes a phase comparator 210, a pixel counter 240, a timing generator 250, a tracking filter 220, an adder 230, and a VCR signal detector 260. The phase comparator 210, the pixel counter 240, the timing generator 250, the tracking filter 220, and the adder 230 are included within the tracking portion 110 of FIG. 1.

The conventional VCR signal detector in principle regards a signal outside of a frequency of 15.734 kHz as a VCR signal (VCR_DET) in the case of the National Television System Committee standard (NTSC) method by discriminating a horizontal frequency of a lock-up synchronous signal (SYNC_S) during a specific time. The phase comparator 210 generates a phase error (PHASE_ERR) between an input synchronous signal (SYNC_S) and a standard horizontal synchronous signal. The tracking filter 220 receives the phase error, performs a specific operation, and generates a error value (ERROR). The adder 230 adds an error value (ERROR) to an offset value (OFFSET), generates a frequency value (FREQ) according to the phase error (PHASE_ERR), and applies it to the discrete time oscillating portion 120. The discrete time oscillating portion 120 produces a system clock signal (SYSCLK) of 27 MHz with the analog phase locked loop 130. Here, the standard horizontal synchronous signal is a 27 MHz, 1716 period signal in the case of the NTSC standard, and the offset value (OFFSET) is a standard value for producing a horizontal frequency of 15.734 kHz in the case of the NTSC standard.

The VCR signal detector 260 obtains a mean value by performing an operation on the error value (ERROR) output from the tracking filter 220 through an infinite impulse response (IIR) filter, and detects the mean value as a VCR signal (VCR_DET) if it is higher than a specific value. If the error value (ERROR) output from the tracking filter 220 is 0, it is a case where the synchronous signal (SYNC_S) identical to 1716 period of the system clock signal (SYSCLK) is input, and is locked up as the horizontal frequency of 15.734 kHz exactly. If the error value (ERROR) output from the tracking filter 220 is not 0, then there are two possible cases. First, when a channel is changed, the non-zero error value (ERROR) is generated for a while in a lock-up transition period of 15.734 kHz, and then, when the frequency is locked up again, the error value continues to be 0. Second, when the horizontal synchronous signal out of the range of 15.734 kHz is locked up, the error value (ERROR) is continuously maintained to not be 0, but rather maintained at a specific value. In the VCR detector 260, for the first case, since the mean value of the error value (ERROR) in one field is 0, an input synchronous signal (SYNC_S) is not recognized as the VCR signal (VCR DET). However, for the second case, the input synchronous signal is recognized as the VCR signal (VCR_DET). A specific value recognized as the VCR signal (VCR_DET) can be selected at various levels since there are various VCR signals (VCR_DET), and generally determined to be in the range of 100 to 2000 ppm.

Accurate detection of a VCR signal by the conventional method for discriminating the extent to which the signal varies from the 15.734 kHz standard frequency of the NTSC method for a specific time is difficult, because there are various VCR signals. In particular, it is difficult to differentiate a VCR signal that varies slightly out of the frequency range of 15.734 kHz from other signals that are not actually VCR signals. In this manner, the non-VCR signals are mistakenly recognized as VCR signals.

SUMMARY OF THE INVENTION

To address the above limitations, it is an objective of the present invention to provide an apparatus for detecting a VCR signal using a phase error generated in a head switch pulse period, a characteristic of a VCR signal.

It is another objective of the present invention to provide a method for detecting a VCR signal using a phase error generated in a head switch pulse period, a characteristic of a VCR signal.

Accordingly, to achieve the above objective, there is provided an apparatus for detecting a VCR signal comprising a horizontal tracking portion for receiving a synchronous signal of an image signal and a system clock signal, for determining and outputting a phase error between the synchronous signal and a standard horizontal synchronous signal generated by the system clock signal, and generating a horizontal synchronous signal and a vertical synchronous signal in response to the system clock signal, and a VCR signal detecting portion for receiving the vertical synchronous signal, the horizontal synchronous signal, and the phase error, and detecting the VCR signal.

The horizontal tracking portion comprises a phase comparator for receiving the synchronous signal and the system clock signal, and generating the phase error as a phase difference between the synchronous signal and the standard horizontal synchronous signal at every horizontal line, a pixel counter for receiving and counting the system clock signal, and a timing generator for receiving an output of the pixel counter, and generating the horizontal synchronous signal and the vertical synchronous signal.

The VCR signal detecting portion comprises a head switch pulse period generator and a VCR signal detector. The head switch pulse period generator is reset by the vertical synchronous signal, receives the horizontal synchronous signal, and determines a specific pulse period as a head switch pulse period. The VCR signal detector receives the phase error during the head switch pulse period, and detects the synchronous signal as the VCR signal if the phase error exceeds a specific standard phase error value.

To achieve another objective of the present invention, there is provided a method for detecting a VCR signal for receiving a synchronous signal of an image signal and a system clock signal, and detecting a VCR signal of the synchronous signal comprising the steps of: (a) receiving the synchronous signal and the system clock signal, and generating a phase error, a phase difference between the synchronous signal and a standard horizontal synchronous signal generated by the system clock signal; (b) receiving and counting the system clock signal, and generating a counter value; (c) receiving the counter value, and generating a horizontal synchronous signal and a vertical synchronous signal; (d) reset by the vertical synchronous signal, receiving the horizontal synchronous signal, and determining a specific pulse period as a head switch pulse period; and (e) receiving the phase error during the head switch pulse period, and detecting the synchronous signal as the VCR signal if the phase error is more than a specific standard phase error value.

BRIEF DESCRIPTION OF THE DRAWINGS

The above objectives and advantages of the present invention will become more apparent by describing in detail preferred embodiments thereof with reference to the attached drawings in which.

DETAILED DESCRIPTION OF PREFERRED EMBODIMENTS

Figure 1:
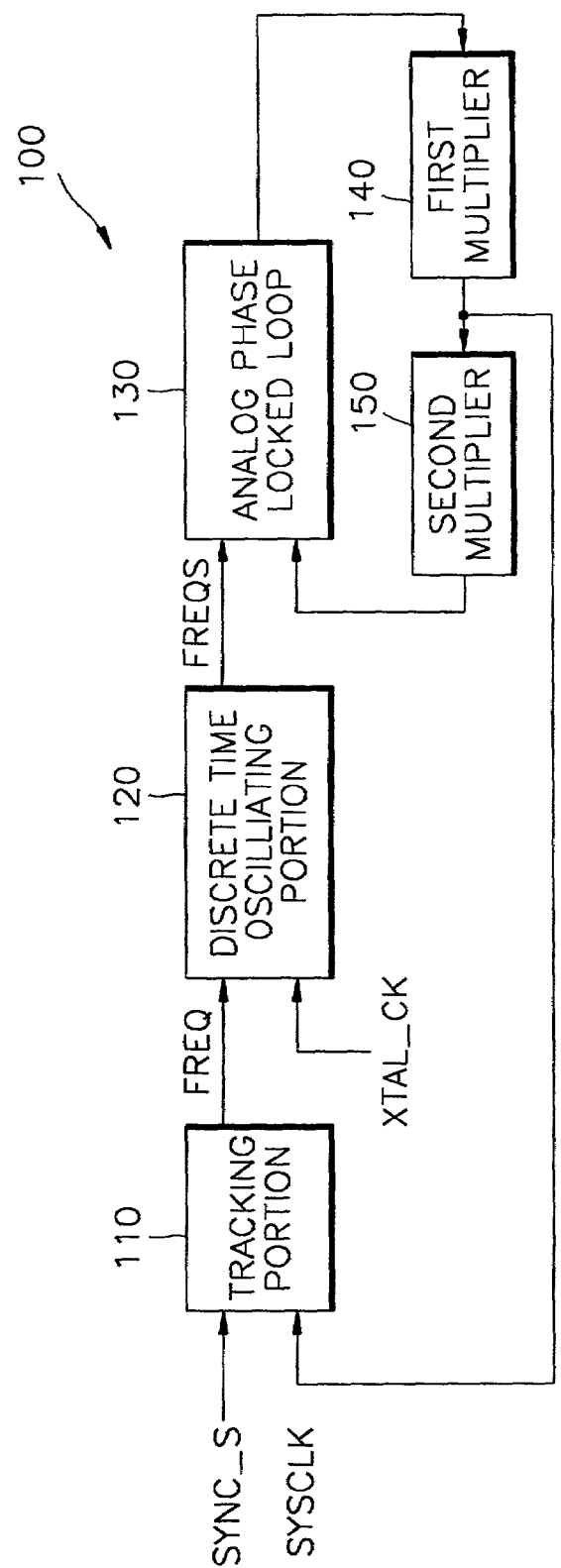
FIG. 1 is a block diagram illustrating a general phase locked loop for horizontal synchronization.
Figure 2:
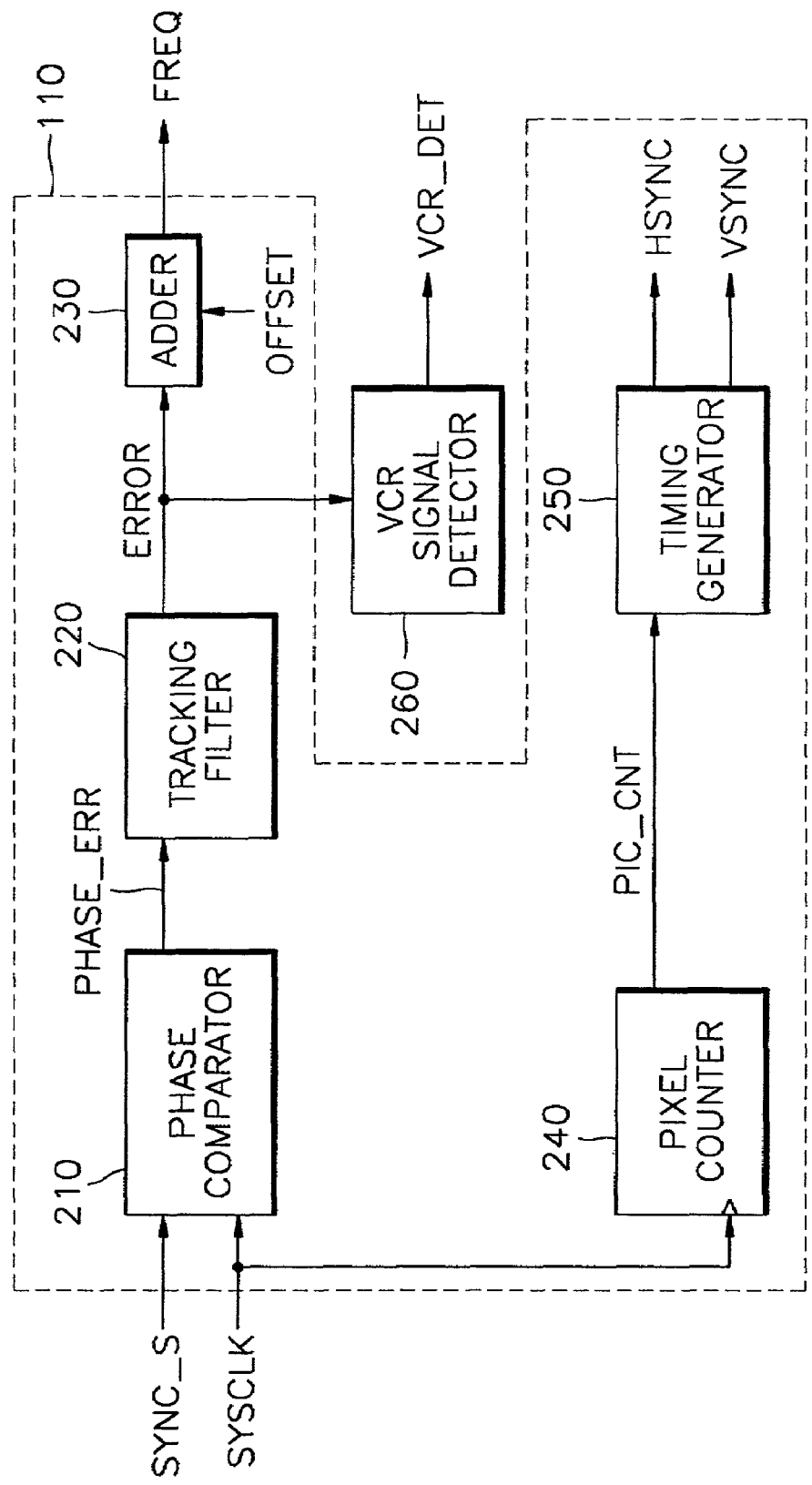
FIG. 2 is a block diagram illustrating a conventional apparatus for detecting a VCR signal.

The present invention now will be described more fully with reference to the accompanying drawings, in which preferred embodiments of the invention are shown. The same reference numerals in different drawings represent the same element, and thus their description will be omitted.

Figure 3:
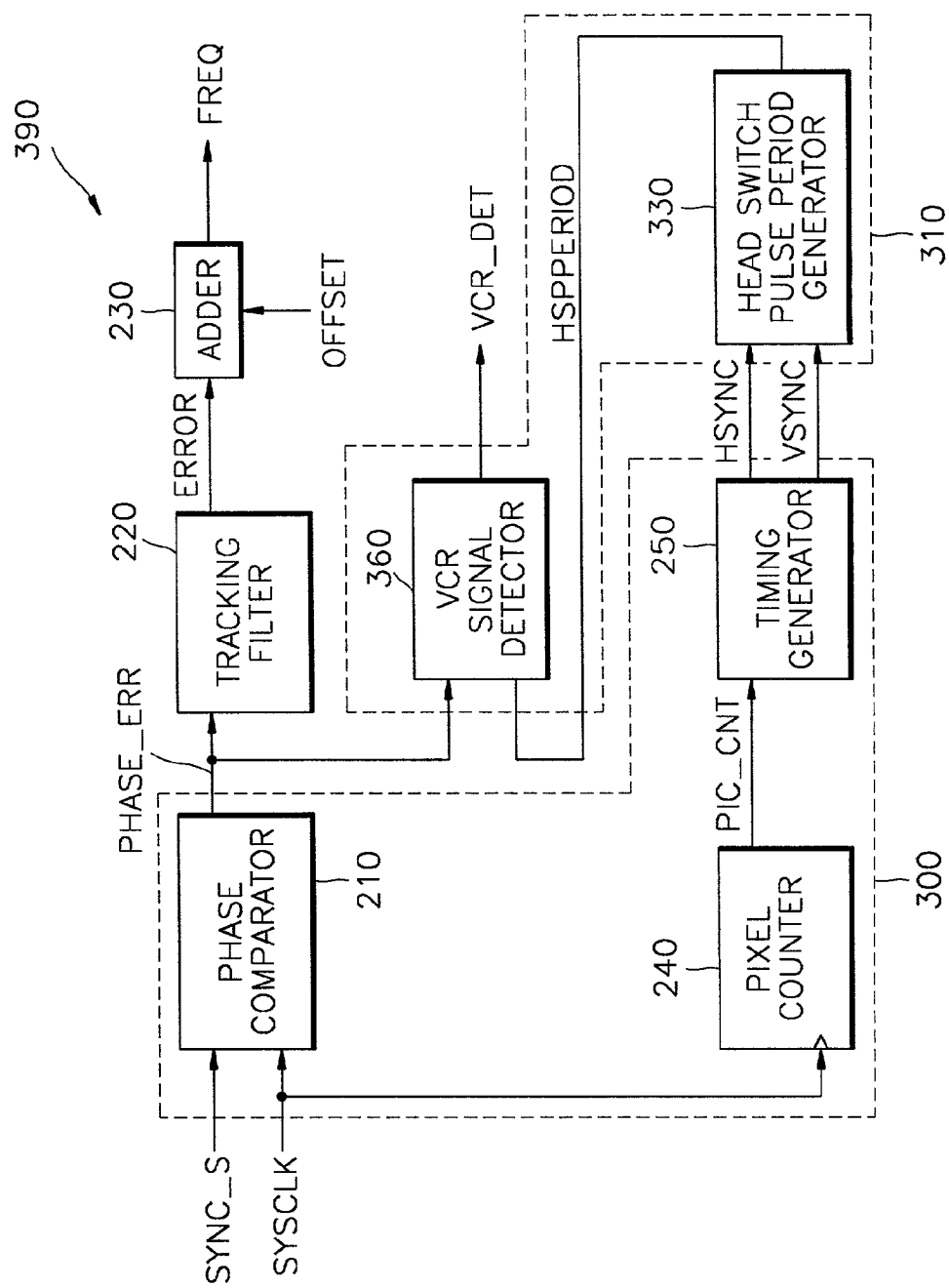
FIG. 3 is a block diagram illustrating an apparatus for detecting a VCR signal according to a preferred embodiment of the present invention.

Referring to FIG. 3, an apparatus for detecting a VCR signal according to a preferred embodiment of the present invention includes a horizontal tracking portion 300 and a VCR signal detecting portion 310.

The horizontal tracking portion 300 receives a synchronous signal (SYNC_S) of image signals and a system clock signal (SYSCLK), detects and outputs a phase error (PHASE_ERR), representing the phase difference between a synchronous signal (SYNC_S) and a standard horizontal synchronous signal generated by a system clock signal (SYSCLK) at every horizontal line, and generates a horizontal synchronous signal (HSYNC) and a vertical synchronous signal (VSYNC) responding to the system clock signal (SYSCLK). The VCR signal detecting portion 310 receives the vertical synchronous signal (VSYNC), the horizontal synchronous signal (HSYNC), and the phase error (PHASE_ERR), and generates a signal (VCR_DET) indicating the detection of a VCR signal.

The horizontal tracking portion 300 includes a phase comparator 210, a pixel counter 240, and a timing generator 250.

The phase comparator 210 receives a synchronous signal (SYNC_S) and a system clock signal (SYSCLK), and generates a phase error (PHASE_ERR), representing the phase difference between a synchronous signal (SYNC_S) and a standard horizontal synchronous signal at every horizontal line. The pixel counter 240 receives a system clock signal (SYSCLK) and counts incrementally. The timing generator 250 receives a pixel counter value (PIC_CNT), an output of the pixel counter 240, and generates a horizontal synchronous signal (HSYNC) and a vertical synchronous signal (VSYNC).

The VCR signal detecting portion 310 includes a head switch pulse period generator 330 and a VCR signal detector 360. The head switch pulse period generator 330 is reset by the vertical synchronous signal (VSYNC), receives the horizontal synchronous signal (HSYNC), and determines a specific pulse period as a head switch pulse period (HSPPERIOD). The VCR signal detector 360 receives a phase error (PHASE_ERR) during the head switch pulse period (HSPPERIOD), and detects the synchronous signal (SYNC_S) as the VCR signal (VCR_DET) when the phase error (PHASE_ERR) exceeds a specific standard phase error value.

The horizontal tracking portion 300 further includes a tracking filter 220 for generating an error value (ERROR) which receives a phase error (PHASE_ERR), performs a predetermined operation, and converts the phase error (PHASE_ERR), and an adder 230 which adds an error value (ERROR) to an offset value (OFFSET) for producing a basic frequency, and generates a frequency value (FREQ) according to the phase error (PHASE_ERR).

The operation of an apparatus for detecting a VCR signal 390 and a method for detecting a VCR signal will now be described more fully with reference to FIG. 3.

The VCR signal (VCR_DET) generates a phase error (PHASE_ERR), an output of the phase comparator 210 by the head switch pulse produced at every field, in a manner contrary to that a television signal. Therefore, a period of generating the head switch pulse is determined at every field, and the phase error (PHASE_ERR), an output of the phase comparator 210, is determined at the period. If the phase error (PHASE_ERR) exceeds a predetermined value during a predetermined time, a synchronous signal (SYNC_S) input at that time can be detected as the VCR signal (VCR_DET).

The phase comparator 210 of the horizontal tracking portion 300 compares a pixel counter value (PIC_CNT) by the system clock signal (SYSCLK) when a synchronous signal (SYNC_S) is input with a standard value of a standard horizontal synchronous signal by the system clock signal (SYSCLK), and outputs its phase error (PHASE_ERR). The standard value of the standard horizontal synchronous signal becomes a 1716 period because one horizontal line is formed of a 1716 period when the pixel counter 240 is driven by a system clock signal (SYSCLK) of 27 MHz in the case of the NTSC (National Television System Committee) standard. For example, the value obtained by subtracting 1716 from a pixel counter value (PIC_CNT) by the system clock signal (SYSCLK) when a synchronous signal (SYNC_S) is input becomes a phase error (PHASE_ERR).

The pixel counter 240 comprises a counter that uses the system clock signal (SYSCLK) as a clock and can count from 30 to 1745 for generating a horizontal synchronous signal (HSYNC) having a 1716 period in the case of the NTSC standard. The timing generator 250 receives the pixel counter value (PIC_CNT) output from the pixel counter 240, generates the horizontal synchronous signal (HSYNC) of the 1716 period which will be used for the entire system, senses a vertical serrated pulse from a complex image signal, and generates a vertical synchronous signal (VSYNC). The tracking filter 220 receives the phase error (PHASE_ERR), performs a predetermined operation, and generates the error value (ERROR). An operation through the tracking filter 220 is close to a lock-up time. As the operation amount increases at every horizontal line, the lock-up time becomes faster, but the operation through the tracking filter 220 is sensitive to noise. As the operation amount decreases, the operation through the tracking filter 220 is less sensitive to noise, but the lock-up time becomes longer. A frequency value (FREQ) obtained by adding and subtracting the error value (ERROR) with the offset value (OFFSET) for generating a basic frequency by the adder 230 and input into the discrete time oscillating portion 120, is generated.

The head switch pulse period generator 330 of the VCR signal detecting portion 310 is reset by the vertical synchronous signal (VSYNC) generated from the timing generator 250, and the head switch pulse period (HSPPERIOD) is determined by a horizontal line counter (not shown), in which the count increases by one at every horizontal synchronous signal (HSYNC). The head switch pulse period (HSPPERIOD) is usually determined from 10 lines before the start of an equalizing pulse, to the equalizing pulse generating point.

The VCR signal detector 360 receives the phase error (PHASE_ERR) during the head switch pulse period (HSPPERIOD), and detects an input synchronous signal (SYNC_S) as the VCR signal (VCR_DET) if the phase error (PHASE_ERR) exceeds a specific standard phase error value during a specific field time. Since the structures of the head switch pulse period generator 330 and the VCR signal detector 360 are apparent to those skilled in the art, the description thereof is omitted. The standard phase error value can be determined to be various values because the phase errors (PHASE_ERR) are different according to the head switch pulse in the respective video cassette recorders (VCR), and a specific field time is generally based on ±16 fields.

As described above, the apparatus and the method for detecting the VCR signal have advantages in that the exact VCR signal can be detected because an input signal at a frequency out of the range of 15.734 kHz is not recognized as a VCR signal if the phase error is not generated in the head switch pulse period.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An apparatus for detecting a VCR signal comprising:
   a horizontal tracking portion for receiving a synchronous signal of an image signal and a system clock signal, for determining and outputting a phase error between the synchronous signal and a standard horizontal synchronous signal generated by the system clock signal, and for generating a horizontal synchronous signal and a vertical synchronous signal in response to the system clock signal; and
   a VCR signal detecting portion for receiving the vertical synchronous signal, the horizontal synchronous signal, and the phase error, and for detecting a video cassette recorder (VCR) signal,
   wherein the horizontal tracking portion comprises:
      a phase comparator for receiving the synchronous signal and the system clock signal, and for generating the phase error as a phase difference between the synchronous signal and the standard horizontal synchronous signal at every horizontal line;
      a pixel counter for receiving and counting the system clock signal; and
      a timing generator for receiving an output of the pixel counter, and for generating the horizontal synchronous signal and the vertical synchronous signal; and
   wherein the VCR signal detecting portion comprises:
      a head switch pulse period generator which is reset by the vertical synchronous signal, receives the horizontal synchronous signal, and determines a specific pulse period as a head switch pulse period; and
      a VCR signal detector for receiving the phase error during the head switch pulse period, and for detecting the synchronous signal as the VCR signal if the phase error exceeds a specific standard phase error value.

2. The apparatus of claim 1, wherein the horizontal tracking portion further includes:
   a tracking filter for receiving the phase error and generating an error value obtained by converting the phase error; and
   an adder for generating a frequency value according to the phase error by adding the error value to an offset value for generating a basic frequency.

3. The apparatus of claim 1, wherein the standard phase error value is determined according to the type of video cassette recorder (VCR).

4. An apparatus for detecting a VCR signal comprising:
   a phase comparator for receiving a synchronous signal of an image signal and a system clock signal, and generating a phase error as the phase difference between the synchronous signal and a standard horizontal synchronous signal generated by the system clock signal at every horizontal line;
   a pixel counter for receiving and counting the system clock signal;
   a timing generator for receiving an output of the pixel counter, and generating a horizontal synchronous signal and a vertical synchronous signal;

a head switch pulse period generator which is reset by the vertical synchronous signal, receives the horizontal synchronous signal, and determines a specific pulse period as a head switch pulse period; and a VCR signal detector for receiving the phase error during the head switch pulse period, and detecting the synchronous signal as the VCR signal if the phase error exceeds a specific standard phase error value.

5. The apparatus of claim 4, wherein the standard phase error value is determined according to the type of video cassette recorder (VCR).

6. A method for receiving a synchronous signal of an image signal and a system clock signal and detecting a VCR signal of the synchronous signal, the method comprising the steps of:

(a) receiving the synchronous signal and the system clock signal, and generating a phase error as a phase difference between the synchronous signal and a standard horizontal synchronous signal generated by the system clock signal at every horizontal line;

(b) receiving and counting the system clock signal, and generating a counter value;

(c) receiving the counter value, and generating a horizontal synchronous signal and a vertical synchronous signal;

(d) determining a specific pulse period reset by the vertical synchronous signal and receiving the horizontal synchronous signal as a head switch pulse period; and (e) receiving the phase error during the head switch pulse period, and detecting the synchronous signal as the VCR signal if the phase error is more than a specific standard phase error value.

7. The method of claim 6, wherein the standard phase error value is determined according to the type of video cassette recorder (VCR).

* * * * *